Oct. 19, 1943.   J. L. WILBURN   2,332,036
FISHHOOK AND LURE KEEPER
Filed March 10, 1943

J. L. Wilburn
INVENTOR.

BY
ATTORNEYS

Patented Oct. 19, 1943

2,332,036

UNITED STATES PATENT OFFICE 2,332,036

FISHHOOK AND LURE KEEPER

John L. Wilburn, Texarkana, Tex.

Application March 10, 1943, Serial No. 478,703

3 Claims. (Cl. 43—32)

This invention aims to provide novel means for mounting fish hooks, flies, lures and the like in such a manner that they will be conveniently disposed with respect to a fisherman, and be protected against the inroads of insects or vermin when the parts mentioned are stowed away.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
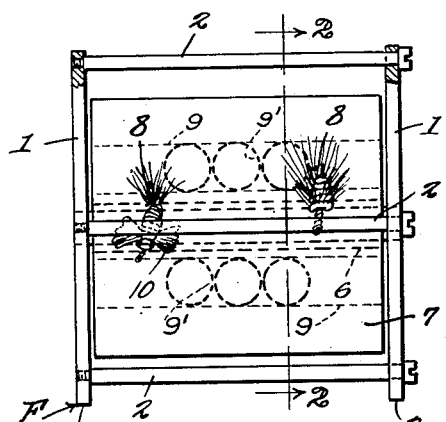
Fig. 1 shows in side elevation, a device constructed in accordance with the invention.

In carrying out the invention, there is provided a frame F, which may be constructed as desired. Preferably, but not of necessity, the frame F includes plate-like end members 1, united by rod-like connections 2. The end plates 1 have straight lower edges 3, whereby the device may be set up on a support (not shown) and, for a reason to be described hereinafter, the upper edges of the end plates 1 are rounded as shown at 4.

The numeral 5 designates a shaft. The shaft 5 may be fixed to a tubular core 6, the ends of the shaft being mounted rotatably in the end plates 1: or the core 6 may be rotatable on the shaft, the ends of the shaft being rotatable in the end plates, the showing of the drawing being the same in either instance. The point is, that by some suitable means, the core 6 is mounted to rotate between the end plates 1.

To the tubular core 6 is secured a body 7, which preferably is cylindrical. In its outer surface, the body 7 is adapted to receive fish hooks 8, and because the upper ends of the plates 1 are curved, any fish hook which is brought toward the top of the device, may be removed readily from the body 7. The body 7 has chambers 9 for receiving a disinfectant, such as moth balls 9' shown in Fig. 1. The chambers 9 may be in the form of longitudinal bores, for the ends of which, the plates 1 constitute closures, although one end plate may be removed readily, to permit the insertion of disinfectant.

The body 7 may be treated in any desired way, either by disinfectant in the bores 9, or otherwise, to repel insects and vermin which might otherwise eat the feathers 10 or other material which, being carried by the hook 8, form a fly. The body 7 is made of material which is porous and waterproof, and soft enough to permit the entrance of the hooks 8 thereinto. The use of sponge rubber or an equivalent material is recommended in the formation of the cylindrical body 7. The body, owing to its construction, will drain and dry quickly, practically no moisture remaining, to rot the fly 10 or rust the hook 8. The body 7 may be rotated, so that any portion thereof may be disposed in such a position with respect to the plates 1 that a hook may be mounted readily in the body, in accessible position and at random, a removal of the hook, upon occasion, being attended with no difficulty. The periphery of the body 7 is spaced far enough from the outer edges of the plates 1, so that the hooks or flies 10 already mounted on the body, will be protected whilst other hooks are being inserted into the body. There will be no entangling of the hooks, and this is especially true, if the hooks happen to be provided with snells.

Figure 2:
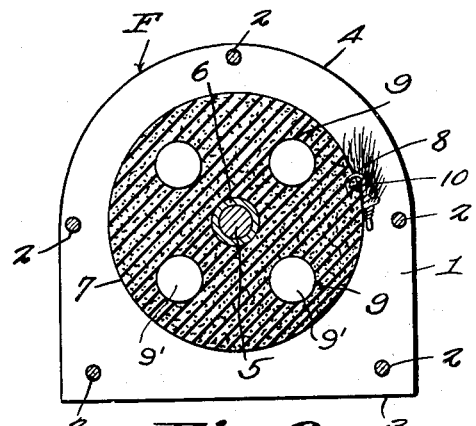
Fig. 2 is a section on the line 2—2 of Fig. 1.
Figure 3:
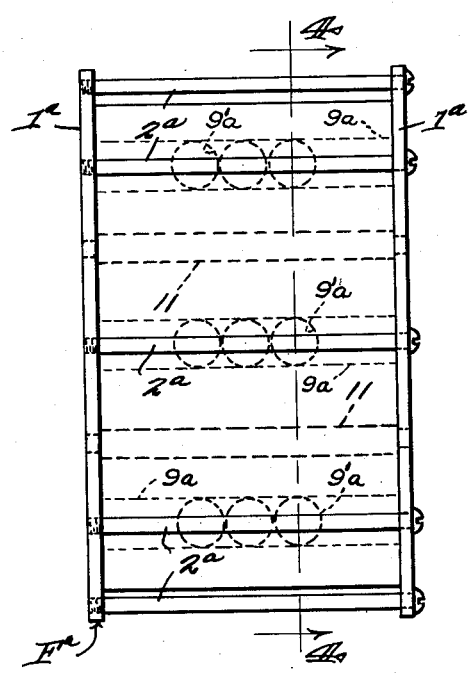
Fig. 3 is a side elevation showing a modification.
Figure 4:
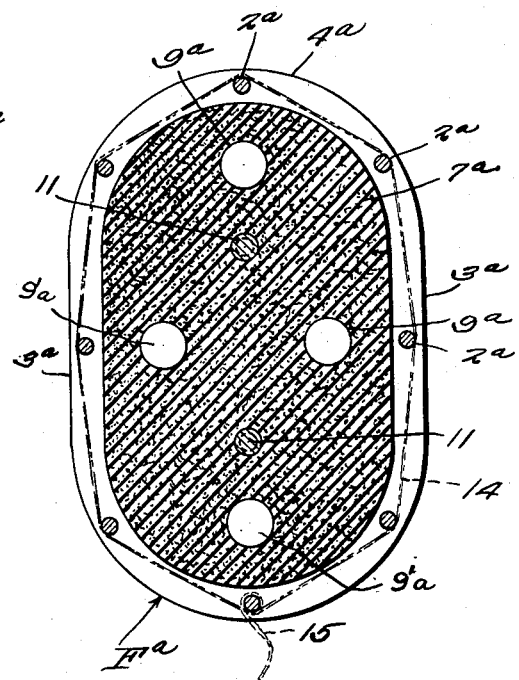
Fig. 4 is a section on the line 4—4 of Fig. 3.

In Figs. 1 and 2, the body 7 is rotatable, but in Figs. 3 and 4 the body 7a is not rotatable but is bound fixedly between the end plates 1a, by the connections 2a. The end plates 1a are bound the more securely on the body 7a by connections 11, located in the median longitudinal plane of the body 7a. In the form shown in Figs. 3 and 4, the end plates 1 are rounded at their opposite ends, as at 4a, and the plates have straight sides 3a, the parts mentioned corresponding, respectively, in function, with the parts 4 and 3 of Fig. 2.

It is shown in Fig. 4 that a fish line 14 may be wound about the connections 2a, and the same operation may be carried out with respect to the form shown in Fig. 2, the end plates 1 and 1a projecting far enough outwardly beyond the connections to prevent the reeled up line from sliding off the device endwise thereof. As indicated at 15 in Fig. 4, the fish line 14 may be layed upon any selected one of the connections 2a, and the same observation is true with respect to the connections 2 of Fig. 2.

The device forming the subject matter of this application is simple in construction, but it affords a means whereby hooks, flies and lures may be mounted in an accessible position, and be kept dry and protected against the inroad of moths and the like.

Having thus described the invention, what is claimed is:

1. In a holder for fish lines, hooks, flies and lures, a frame and a hook-receiving body, the body being made of waterproof material which is of open work construction, to afford drying drainage and ventilation for hooks, flies and lures embedded therein, the frame comprising end members and connections joining the end members, the connections and the end members forming a reel on which a fish line may be wound, the connections being spaced widely apart transversely to afford drying drainage and ventilation for a line wound upon the reel, the body extending, at a substantially common diameter between the end members, and means for mounting the body rotatably between the end members.

2. In a holder for fish lines, hooks, flies and lures, a frame and a hook-receiving body assembled with the frame and made up of open work construction, to afford drying drainage and ventilation, for hooks, flies and lures embedded therein, the frame comprising end members and connections joining the end members, the connections and the end members forming a reel on which a fish line may be wound, the connections being spaced widely apart transversely to afford drying drainage and ventilation for a line wound upon the reel, the body extending, at a substantially common diameter between the end members, the connections binding the end members on the body to hold it against rotation.

3. In a holder for fish hooks, flies and lures, a frame and a hook-receiving body assembled with the frame and made of open work material, the frame comprising end members and a connection uniting the end members, the body having an opening for the reception of a disinfectant, one of the end members constituting a detachable closure for the opening.

JOHN L. WILBURN.